Patented Apr. 21, 1925.

1,534,389

UNITED STATES PATENT OFFICE.

ALBERT C. HOLZAPFEL, OF NEW YORK, N. Y.

TREATMENT OF BITUMINOUS SUBSTANCES.

No Drawing.   Application filed April 30, 1923.   Serial No. 635,773.

*To all whom it may concern:*

Be it known that I, ALBERT C. HOLZAPFEL, a citizen of the United States, residing at New York, in the county of New York and State of New York, have invented certain new and useful Improvements in Treatment of Bituminous Substances, of which the following is a specification.

This invention relates to the treatment of bituminous substances, such as asphalt, pitch, and the like, and more particularly to a method of rendering such substances noninflammable.

Asphalt, pitch, and similar materials are employed to a great extent in the manufacture of waterproof roofing. One very serious objection to the use of such materials in the manufacture of roofing is the ready combustibility and inflammability of asphalt, pitch and other bituminous substances. These properties of bituminous materials are reduced in some measure by the addition of a considerable quantity of incombustible mineral matter in the manufacture of roofing. Nevertheless, the finished roofing is highly combustible and inflammable and is therefore a constant source of danger in case of fire.

In order to eliminate this inflammability, I add to a mixture of bituminous substances and other material to be used in the manufacture of roofing, or for any other purpose, a quantity of calcium chlorid. The proportion in which the calcium chlorid is added may vary within wide limits but I have found that from 10 per cent to 25 per cent of the amount of asphalt or bitumen present in the mixture is sufficient. The calcium chlorid in the mixture prevents the asphalt or bitumen from catching fire.

The calcium chlorid may be added in any desired way, being thoroughly mixed with the material from which the roofing or other product is to be manufactured. As stated, the proportion of 10 per cent to 25 per cent of calcium chlorid to the asphalt or bitumen present in the mixture produces a product in which the asphalt or bitumen is prevented from catching fire under practically all temperatures. The finished waterproofing material to be used for roofing or other purposes is not altered in any respect by the addition of the calcium chlorid.

While the combustibility of the product is not entirely eliminated, it will merely char or carbonize under the effect of heat and the bituminous substances will not catch fire and flame under practically all temperatures. This will prevent the spreading of fire in buildings or other structures, due to the inflammability of the bituminous substances.

While I have described in detail the preferred practice of my process, it is to be understood that the details of procedure may be widely varied without departing from the spirit of the invention or the scope of the subjoined claims.

Having thus described my invention, I claim:

1. A non-inflammable roofing composition comprising a mixture of a bituminous substance and calcium chlorid.

2. A non-inflammable roofing composition comprising a mixture of a bituminous substance and from 10 to 25 per cent of calcium chlorid.

3. A non-inflammable roofing composition comprising a mixture of mineral matter and bitumen, and from 10 to 25 per cent of calcium chlorid calculated on the bitumen content.

4. A non-inflammable roofing composition comprising a mixture of mineral matter, bitumen, and not less than 10 per cent calcium chlorid calculated on the bitumen present.

5. The method of rendering bituminous substances substantially non-inflammable which comprises adding from 10 to 25 per cent of calcium chlorid thereto.

In testimony whereof, I affix my signature in presence of two witnesses.

ALBERT C. HOLZAPFEL.

Witnesses:
 WILLIAM MARTIN,
 F. J. PERCY.